(12) United States Patent
Hama (10) Patent No.: US 7,116,769 B2
(45) Date of Patent: Oct. 3, 2006

(54) TELEPHONE HAVING PHONE NUMBER REGISTRATION FUNCTION, PHONE NUMBER REGISTRATION METHOD, AND CALL REGISTER DISPLAY METHOD

(75) Inventor: Mitsuji Hama, Higashiosaka (JP)

(73) Assignee: Sanyo Electric Co., Ltd., Osaka-Fu (JP)

( * ) Notice: Subject to any disclaimer, the term of this patent is extended or adjusted under 35 U.S.C. 154(b) by 455 days.

(21) Appl. No.: 10/374,117

(22) Filed: Feb. 25, 2003

(65) Prior Publication Data

US 2003/0220099 A1    Nov. 27, 2003

(30) Foreign Application Priority Data

Feb. 26, 2002    (JP) .............................. 2002-049161

(51) Int. Cl.
  H04M 1/56    (2006.01)
  H04M 15/06   (2006.01)
  H04M 3/00    (2006.01)
  H04M 1/00    (2006.01)
  H04B 1/38    (2006.01)

(52) U.S. Cl. .......................... 379/142.05; 379/142.01; 379/188; 379/207.16; 379/372; 455/415; 455/567

(58) Field of Classification Search ........... 379/142.01, 379/142.04, 142.05, 142.06, 142.1, 142.11, 379/142.17, 93.23, 88.11, 88.12, 88.19, 88.21, 379/207.15, 207.16, 188, 192, 372, 210.02; 455/415, 566, 567
See application file for complete search history.

(56) References Cited

U.S. PATENT DOCUMENTS

| | | | | |
|---|---|---|---|---|
| 5,388,150 | A * | 2/1995 | Schneyer et al. | 379/88.19 |
| 5,452,346 | A * | 9/1995 | Miyamoto | 379/142.04 |
| 5,467,388 | A * | 11/1995 | Redd et al. | 379/210.02 |
| 5,903,632 | A * | 5/1999 | Brandon | 379/93.23 |
| 5,995,603 | A * | 11/1999 | Anderson | 379/142.05 |
| 6,198,812 | B1 * | 3/2001 | Weber | 379/142.04 |
| 6,253,075 | B1 * | 6/2001 | Beghtol et al. | 455/415 |
| 6,289,084 | B1 * | 9/2001 | Bushnell | 379/67.1 |
| 6,353,664 | B1 * | 3/2002 | Cannon et al. | 379/142.1 |
| 6,418,211 | B1 * | 7/2002 | Irvin | 379/188 |
| 6,618,473 | B1 * | 9/2003 | Davis | 379/142.05 |
| 6,724,866 | B1 * | 4/2004 | Kuhn et al. | 379/88.21 |
| 6,792,090 | B1 * | 9/2004 | Kobayashi | 379/142.17 |

FOREIGN PATENT DOCUMENTS

| | | |
|---|---|---|
| JP | 01-255348 | 10/1989 |
| JP | 05-114947 | 7/1993 |
| JP | 11-150596 | 6/1999 |
| JP | 11-164010 | 6/1999 |
| JP | 2000-032116 | 1/2000 |
| JP | 2001-024775 | 1/2001 |

* cited by examiner

Primary Examiner—Quoc Tran (57) ABSTRACT

A telephone that includes: a storage unit 108; a transmission/reception unit 102 for, when an incoming call is received, acquiring a caller's phone number corresponding to the incoming call; a counting unit 105 for measuring a time period between a start of a reception of the incoming call and a disconnection of the incoming call; and a one-ring-call judgment unit 107 for, if the measured time period is shorter than a predetermined time period, instructing a general control unit 103 to store the acquired phone number into the storage unit 108 as a target for a connection rejection so that if an incoming call is received from a caller having the stored phone number thereafter, a connection thereto is rejected.

15 Claims, 6 Drawing Sheets

| 301 | 302 | 303 | 304 | 300 |
|---|---|---|---|---|
| SERIAL NO. | NAME | PHONE NO. | ONE-RING-CALL FLAG | |
| 001 | SUZUKI, ICHIRO | 090-□X○X-○XX○ | 0 | |
| 002 | SUZUKI, JIRO | 090-□△X○-○△△○ | 0 | |
| 003 | SUZUKI, SABURO | 090-□X△△-△△XX | 0 | |
| ⋮ | ⋮ | ⋮ | ⋮ | |
| 998 | — | 090-○△□X-○○○○ | 1 | |
| 999 | — | 090-△XX△-○○□□ | 1 | |

TELEPHONE HAVING PHONE NUMBER REGISTRATION FUNCTION, PHONE NUMBER REGISTRATION METHOD, AND CALL REGISTER DISPLAY METHOD

BACKGROUND OF THE INVENTION (1) Field of the Invention

The present invention relates to a telephone having a function to store information.

(2) Description of the Related Art

In recent years, communication devices providing a function called caller ID service have become wide spread. Such communication devices include: telephones connected to regular telephone lines; mobile phones; and PHS (Personal Handyphone System). The caller ID service function notifies a user of a caller's telephone number when the telephone receives an incoming call.

Such communication devices having the caller ID service are hereinafter referred to merely as telephones, for the sake of conveniences.

Each time a telephone receives an incoming call, this function provided in the telephone records the callers' telephone number in the call register. Such a function is convenient for telephone users in that if they fail to answer a call, they can ring back to the caller by referring to the call register.

However, a junk call called Wangiri in Japanese (hereinafter referred to as one-ring-call), which has become a matter of public concern, has been rampant recently. The one-ring-call is a telephony abusing the caller ID service. The caller of one-ring-call discontinues a call before a person on the other end answers the call. The purpose is to enter the one-ring caller's phone number in the call register of the target telephone. With this method, the one-ring caller can enter his/her phone number into the receiver's call register without paying a toll.

If the receiver originates a call to the one-ring caller by dialing the registered phone number, the call would be connected to a reception or guidance of a dating site or the like. This is a waste of money.

If a user, using a telephone connected to a regular telephone line, makes a call to the one-ring caller, the call may be connected to a service called Dial Q2 in which the caller is charged for being supplied with information from the Dial Q2 service. If this happens, the user has to pay the Dial Q2 service fee, as well as the regular toll.

Figure 8:
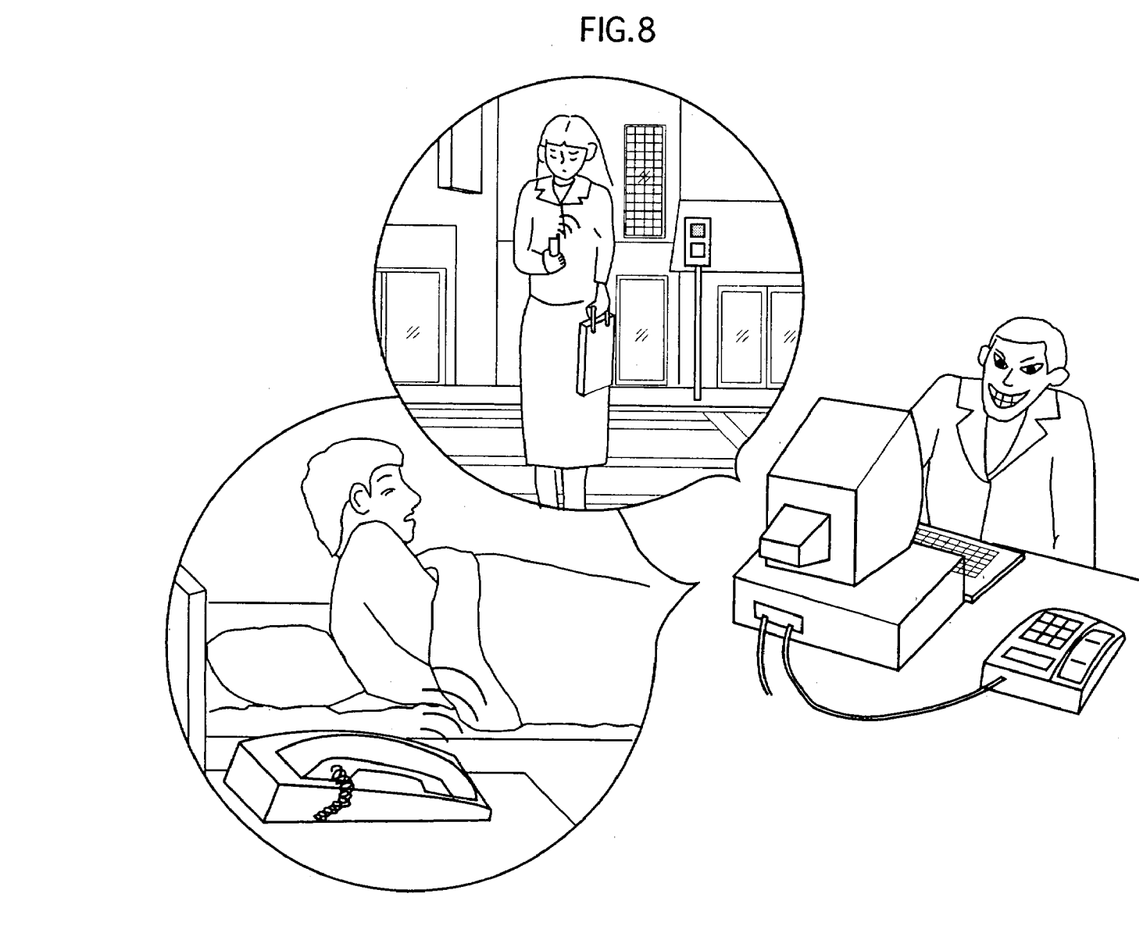
FIG. 8 shows problems created by one-ring-calls.

Also, as shown in FIG. 8, such one-ring-calls may be made anytime day or night. For users who always set their telephones to a receivable mode providing for an emergency, such one-ring-calls would disturb their sweet sleep.

To avoid oneself from becoming a victim of one-ring-calls, the user may disregard the one-ring-calls, without making a call to the one-ring-callers. However, it is difficult to discern one-ring-calls among a lot of phone numbers recorded in the call register.

Also, when a telephone receives an incoming call while the user is at a great distance, the user, who does not know how many times the telephone rang, cannot determine whether the call was a one-ring-call or not.

As understood from the above description, it is difficult for conventional telephone users to avoid themselves from becoming victims of one-ring-calls.

SUMMARY OF THE INVENTION

The first object of the present invention is therefore to provide a telephone with which users can avoid themselves from becoming victims of one-ring-calls.

The second object of the present invention is to provide a phone number registration method for registering a phone number as a target for a connection rejection so that if an incoming call is received from a caller having the registered phone number, a connection thereto is rejected, or a call register display method for displaying a phone number corresponding to an incoming call as information registered with a call register.

The first object is fulfilled by a telephone comprising: a recording medium; an acquisition unit operable to, when an incoming call is received, acquire a caller's phone number corresponding to the incoming call; a judgment unit operable to judge whether a time period between a start of a reception of the incoming call and a disconnection of the incoming call is shorter than a predetermined time period; and a first storage execution unit operable to, if the judgment unit judges affirmatively for the incoming call, store the acquired phone number into the recording medium as a target for a connection rejection so that if an incoming call is received from a caller having the stored phone number thereafter, a connection thereto is rejected.

With the above-described construction, if the time period between the start of reception of the incoming call and disconnection of the incoming call is shorter than the predetermined time period, the caller's phone number is stored in the recording medium, and if an incoming call is received from the caller having the stored phone number thereafter, connection thereto is rejected.

The above telephone may further comprise a connection rejection unit operable to, if the phone number acquired by the acquisition unit matches a phone number having already been stored in the recording medium, execute a connection rejection process for rejecting a connection to the incoming call corresponding to the matching phone number.

With the above-described construction, once the time period between the start of reception of an incoming call and disconnection of the incoming call is shorter than the predetermined time period, if an incoming call is received from the caller having the phone number thereafter, connection thereto is rejected. That is to say, after a one-ring-call is received once, if an incoming call is received from the one-ring-caller thereafter, connection thereto is rejected.

The above telephone may further comprise: a second storage execution unit operable to, if the judgment unit judges negatively for the incoming call, store the acquired phone number into the recording medium as an ordinary phone number; a determination unit operable to determine, for each phone number stored in the recording medium, whether the phone number is an ordinary phone number or a target for a connection rejection; and a first display unit operable to display only phone numbers determined as ordinary phone numbers by the determination unit.

With the above-described construction, if the time period between the start of reception of the incoming call and disconnection of the incoming call is shorter than the predetermined time period, the caller's phone number is not displayed. That is to say, the operator cannot recognize, on the first display unit, a telephone number that is presumed to be of a one-ring-caller. It is therefore difficult for the operator to call back to a party having the telephone number.

In the above telephone, the first storage execution unit may attach a flag to the phone number acquired by the acquisition unit if the judgment unit judges affirmatively for the incoming call so that the acquired phone number is stored together with the flag into the recording medium.

With the above-described construction, it is possible to judge based on the flag whether a connection to an incoming call should be rejected or not.

In the above telephone, the first storage execution unit may store the phone number to which the flag has been attached, into the recording medium only if the phone number has not been stored in the recording medium.

With the above-described construction, once the flag is attached to a phone number, the flag is not removed even if, in terms of an incoming call received from the same caller thereafter, the time period between the start of reception of the incoming call and disconnection of the incoming call is equal to or longer than the predetermined time period. However, the operator can also store the phone number without attaching the flag thereto. With such an arrangement, if, for example, a friend of the operator makes a call to the operator and disrupts the call within the predetermined time period, the operator can avoid incoming calls from the friend thereafter from being rejected.

The above telephone may further comprise: a deletion receiving unit operable to receive from an operator a specification of a phone number that is a target for deleting the flag attached thereto; and a deletion unit operable to turn the specified phone number into an ordinary phone number by deleting the flag from the specified phone number that is stored in the recording medium.

With the above-described construction, even if an incoming call is received from a party whose phone number is registered as a target for connection rejection, the operator can instruct the telephone to connect to the incoming call.

The above telephone may further comprise a storage notification unit operable to, after the first storage execution unit stores the phone number into the recording medium, notify an operator of the storing by the first storage execution unit.

With the above-described construction, the operator can recognize that a phone number was stored in the recording medium as a target for connection rejection.

In the above telephone, the storage notification unit may display the phone number stored in the recording medium when notifying the operator of the storing.

With the above-described construction, the operator can confirm the phone number that is to be stored in the recording medium as a target for connection rejection. That is to say, if a phone number is erroneously stored in the recording medium, the operator is given an opportunity to find the erroneous storage of the phone number.

The above telephone may further comprise: an instruction receiving unit operable to receive an instruction from the operator; a second display unit operable to display the phone number acquired by the acquisition unit if the judgment unit judges affirmatively for the incoming call; and a storage capability inquiring unit operable to inquire the operator whether the displayed phone number should be stored into the recording medium, wherein the first storage execution unit stores the phone number into the recording medium only if the instruction receiving unit receives from the operator an instruction to store the phone number.

With the above-described construction, the operator can give final approval to the storage of the phone number by the first storage execution unit. That is to say, the construction facilitates avoidance of erroneous storage of phone numbers.

The above telephone may further comprise: a call-originating confirmation unit operable to, if the instruction receiving unit receives from the operator an instruction to originate a call by dialing the phone number stored in the recording medium, inquire the operator whether to originate the call by dialing the phone number stored in the recording medium; and a call-originating unit operable to originate the call only if the instruction receiving unit receives an instruction to originate the call in response to the inquiry made by the call-originating confirmation unit.

With the above-described construction, if the operator tries to originate a call to a party with the phone number being a connection rejection target, the telephone inquires the operator whether the operator would really like to make a call. This prevents the operator from making an inadvertent call.

The above telephone may further comprise: a call notification unit operable to keep notifying an operator of the reception of the incoming call all the while the incoming call is received, by outputting a sound, a vibration, or light; and a call notification inhibition unit operable to inhibit the call notification unit from notifying the operator of the reception during the predetermined time period.

With the above-described construction, the operator is not notified of reception of the incoming call, over the predetermined time period. That is to say, the operator avoids suffering from less-important incoming calls, such as one-ring-calls, that last for only short time periods.

The first object is also fulfilled by a telephone comprising: a recording medium; an acquisition unit operable to, when an incoming call is received, acquire a caller's phone number corresponding to the incoming call; a time measuring unit operable to measure a time period between a start of a reception of the incoming call and a disconnection of the incoming call; and a storage execution unit operable to store the acquired phone number and the measured time period as a pair into the recording medium, the phone number and the time period stored in the recording medium being registered with a call register.

With the above-described construction, the acquired phone number and the measured time period are stored as a pair and are registered with a call register. Accordingly, the operator can judge whether a one-ring-call was received based on his/her own standard by referring to the phone number and time period displayed as information registered with the call register.

The first object is also fulfilled by a telephone comprising: a recording medium; an acquisition unit operable to, when an incoming call is received, acquire a caller's phone number corresponding to the incoming call; a judgment unit operable to judge whether a time period between a start of a reception of the incoming call and a disconnection of the incoming call is shorter than a predetermined time period; a call disconnection information generating unit operable to, if the judgment unit judges affirmatively for the incoming call, generate call disconnection information indicating that the incoming call was disconnected within the predetermined time period, and store the acquired phone number and the call disconnection information as a pair into the recording medium; and a call register display unit operable to display the pair of the phone number and the call disconnection information as information registered with a call register.

With the above-described construction, the operator can easily discern a phone number of a caller who made a call to the telephone and disconnected the call within the predetermined time period, by referring to the call register. That is to say, by setting the predetermined time period to be approximately the same as a time period of a one-ring-call, it is possible for the operator to refer to the call register and judge easily whether the operator received a one-ring-call.

The second object is fulfilled by a phone number registration method which is used in a telephone having a recording medium, and is used for registering a phone number as a target for a connection rejection so that if an incoming call is received from a caller having the registered phone number, a connection thereto is rejected, the phone number registration method comprising: an acquisition step for, when an incoming call is received, acquiring a caller's phone number corresponding to the incoming call; a judgment step for judging whether a time period between a start of a reception of the incoming call and a disconnection of the incoming call is shorter than a predetermined time period; and a storage execution step for, if the judgment step judges affirmatively for the incoming call, storing the acquired phone number into the recording medium as a target for a connection rejection so that if an incoming call is received from a caller having the stored phone number thereafter, a connection thereto is rejected.

With the above-described construction, if the time period between the start of reception of the incoming call and disconnection of the incoming call is shorter than the predetermined time period, the caller's phone number is stored in the recording medium, and if an incoming call is received from the caller having the stored phone number thereafter, connection thereto is rejected.

The second object is also fulfilled by a phone number registration method which is used in a telephone having a recording medium, and is used for registering a phone number of a call destination, the phone number registration method comprising: an acquisition step for, when an incoming call is received, acquiring a caller's phone number corresponding to the incoming call; a time measuring step for measuring a time period between a start of a reception of the incoming call and a disconnection of the incoming call; and a storage execution step for storing the acquired phone number and the measured time period as a pair into the recording medium, the phone number and the time period stored in the recording medium being registered with a call register.

With the above-described construction, the operator can judge whether the operator received a one-ring-call based on his/her own standard by referring to the phone number and time period displayed as information registered with the call register.

The second object is also fulfilled by a call register display method which is used in a telephone having a recording medium, and is used for displaying a phone number of an incoming call, the call register display method comprising: an acquisition step for, when an incoming call is received, acquiring a caller's phone number corresponding to the incoming call; a judgment step for judging whether a time period between a start of a reception of the incoming call and a disconnection of the incoming call is shorter than a predetermined time period; a call disconnection information generating step for, if the judgment step judges affirmatively for the incoming call, generating call disconnection information indicating that the incoming call was disconnected within the predetermined time period, and storing the acquired phone number and the call disconnection information as a pair into the recording medium; and a call register display step for displaying the pair of the phone number and the call disconnection information as information registered with a call register.

With the above-described construction, the operator can easily discern a phone number of a caller who made a call to the telephone and disconnected the call within the predetermined time period, by referring to the call register. That is to say, by setting the predetermined time period to be approximately the same as a time period of a one-ring-call, it is possible for the operator to refer to the call register and judge easily whether the operator received a one-ring-call.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Construction

Figure 1:
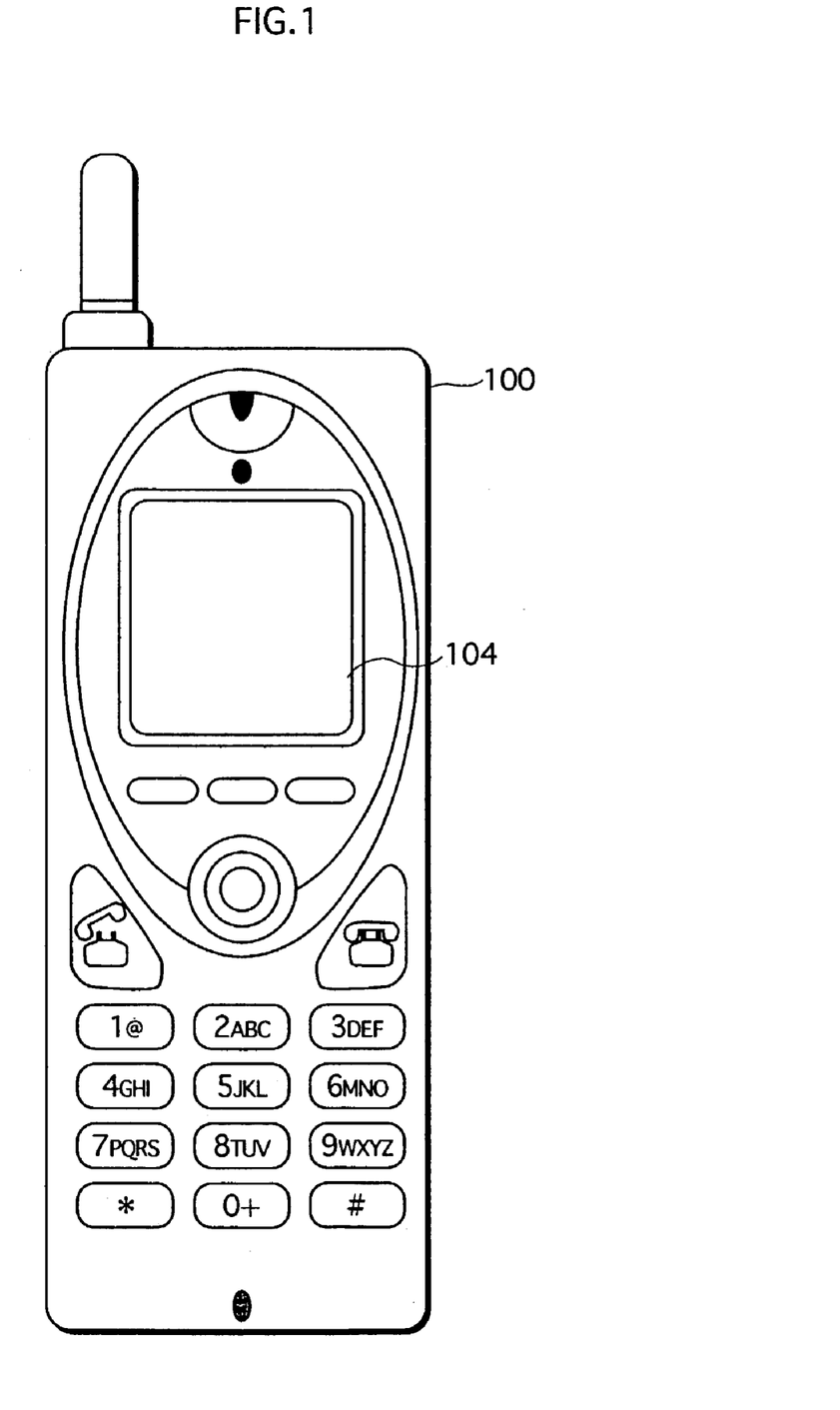
FIG. 1 shows an appearance of the mobile station in an embodiment of the present invention.

FIG. 1 shows an appearance of a mobile station 100 in an embodiment of the present invention.

The mobile station 100 is a mobile phone that provides the caller ID service function that notifies the user of the mobile phone of a caller's telephone number when the mobile phone receives an incoming call, and is used for performing a radio communication to transmit or receive data such as audio data, image data, or e-mails.

A display unit 104 shown in FIG. 1 displays the contents of the call register, that is, telephone numbers acquired when incoming calls are received, the contents of e-mails, a list of telephone numbers registered by the user, and the like.

Figure 2:
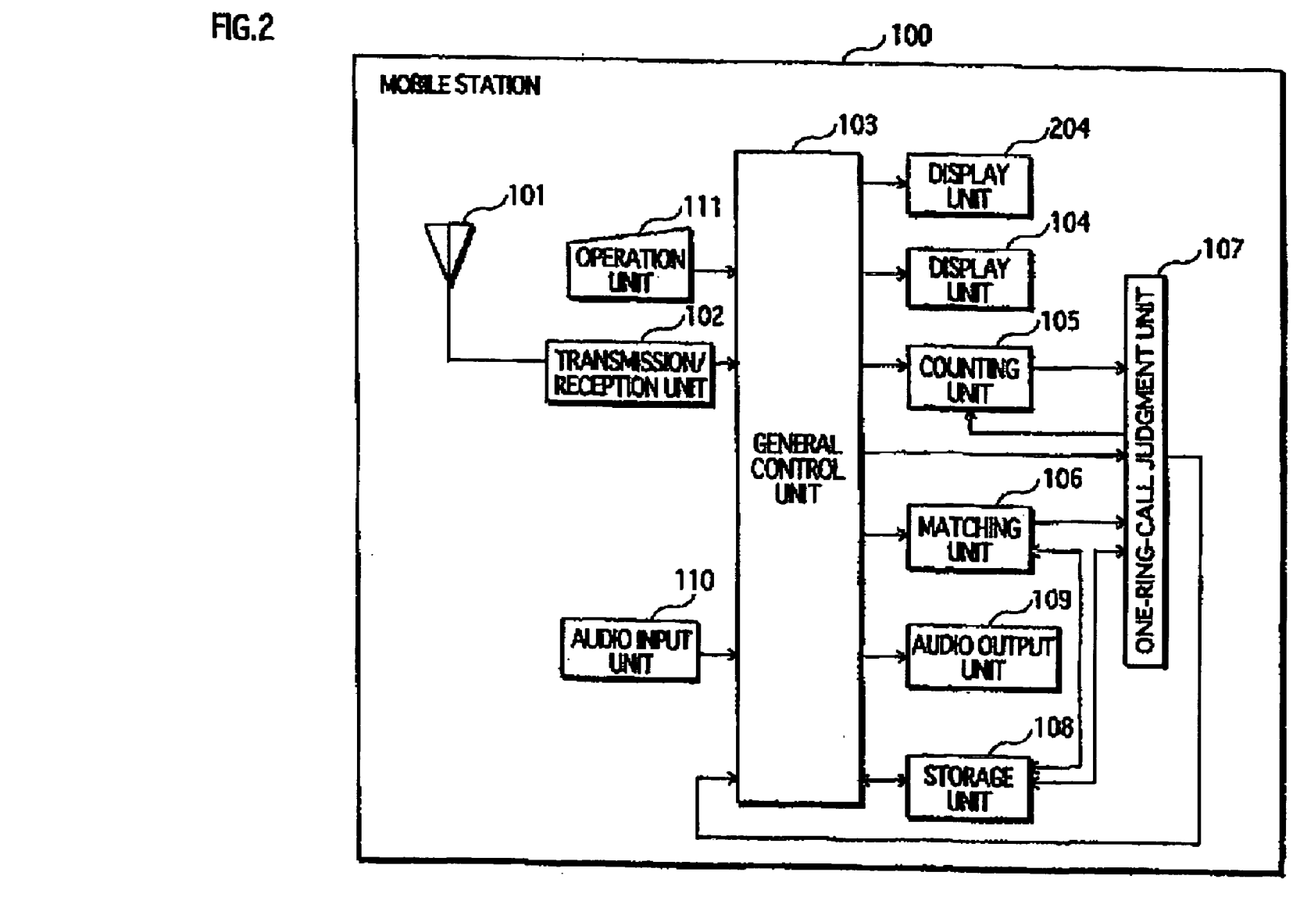
FIG. 2 is a functional block diagram of the mobile station in the embodiment of the present invention.

FIG. 2 is a functional block diagram of the mobile station 100 in the present embodiment.

The mobile station 100 includes: an antenna unit 101; a transmission/reception unit 102 being an example of the acquisition unit; a general control unit 103; a display unit 104 and a display unit 204 being an example of the first and second display units, the storage notification unit, and the call register display unit; a counting unit 105 being an example of the time measuring unit; a matching unit 106; a one-ring-call judgment unit 107 being an example of the judgment unit; a storage unit 108 being an example of the recording medium; an audio output unit 109 being an example of the cell notification unit; an audio input unit 110; and an operation unit 111 being an example of the deletion receiving unit and the instruction receiving unit.

The general control unit 103 is an example of the first and second storage execution units, the connection rejection unit, the determination unit, the deletion unit, the storage capability inquiring unit, the call-originating confirmation unit, the call-originating unit, and the call notification inhibition unit.

The operation unit 111 includes ten keys used to input character sequences of telephone numbers, e-mails or the like, and outputs the input information such as telephone numbers input via such keys to the general control unit 103.

The operation unit 111 also receives names and telephone numbers input by the user for what is called telephone directory registration function, which is used by the user to register names and telephone numbers with the mobile station 100 in advance to dispense with the input of a telephone number for each outgoing call. The operation unit 111 outputs the received names and telephone numbers to the general control unit 103.

The operation unit 111 further receives input of a one-ring-call threshold value that is used for a judgment on whether an incoming call is a one-ring-call or not. The operation unit 111 further receives input of a value of a ringer setting flag that indicates whether to activate a ringer before completion of the judgment on whether an incoming call is a one-ring-call.

The one-ring-call threshold value has the scale in seconds, and indicates a time period of an incoming call, where if an incoming call is disconnected within the time period, the incoming call is judged to be a one-ring-call.

Also, the value of the ringer setting flag can be set by the user. The user sets the ringer setting flag to "1" when the user wants to inhibit the ringer from ringing before completion of the judgment on whether an incoming call is a one-ring-call, and sets the flag to "0" to allow the ringer to ring.

The audio input unit 110 is achieved by a microphone or the like and outputs input audio data to the general control unit 103.

The counting unit 105 has an initial value "0", and adds "1" to the initial value each time one second passes since a reception of a signal from the general control unit 103, and notifies the current count value to the one-ring-call judgment unit 107 for each addition of the value "1".

The general control unit 103 is achieved by a DSP (Digital Signal Processor), which controls general processes of a radio telephone or the like, and executes the following processes.

The general control unit 103 executes a process of originating and establishing a call after the operation unit 111 receives from the user a call-destination telephone number and an instruction to permit connection.

The general control unit 103 also executes a process of disconnecting a call after the operation unit 111 receives an instruction to disconnect the call.

Since the above-described processes executed by the general control unit 103 are known, a detailed explanation thereof is omitted here.

The general control unit 103, after the operation unit 111 receives a telephone number as a call destination selected from telephone numbers stored in the storage unit 108, refers to a value of a flag (hereinafter referred to as one-ring-call flag) that is attached to the selected telephone number, and if the flag value is "1", causes the display unit 104 to display a message "There is a possibility that this phone number is a one-ring-caller's. Would you really like to make a call?".

After causing the display unit 104 to display the message, the general control unit 103 judges whether the operation unit 111 has received an instruction to originate a call, and if it judges affirmatively, executes the process of originating a call by dialing the telephone number and establishing the call.

If the general control unit 103 judges that the operation unit 111 has received an instruction not to originate a call, the general control unit 103 does not dial the telephone number and wait for an incoming call or an instruction to originate a call.

The general control unit 103 further executes the following processes when an incoming call is received.

The general control unit 103 acquires the caller's phone number and immediately outputs the acquired phone number to the matching unit 106.

The general control unit 103, if a call connection request from the base station is disrupted before a connection is established with the incoming call, outputs a call disruption notification to the one-ring-call judgment unit 107.

The general control unit 103 also executes either of the two following processes in response to an instruction that is issued by the one-ring-call judgment unit 107 based on the matching results by the matching unit 106.

If it receives a connection permission instruction from the one-ring-call judgment unit 107, the general control unit 103 executes the process for ordinary incoming calls. That is to say, the general control unit 103 starts the process for establishing a call when the operation unit 111 receives a connection permission instruction.

If the general control unit 103 receives a connection rejection instruction from the one-ring-call judgment unit 107, the general control unit 103 executes the process for rejecting connection to the call, and at the same time, inhibits the display unit 104 from displaying the acquired caller's phone number as a phone number registered with the call register.

More specifically, in the process for rejecting connection to the call, the general control unit 103 notifies the base station having transmitted a call connection request, of rejection of connection to the call. The base station, upon receiving the rejection notification, disrupts the connection process.

When an incoming call is received, the general control unit 103 suspends activation of the ringer until it receives a ringer activation instruction from the operation unit 111 if the value of the ringer setting flag stored in the storage unit 108 is "1".

More specifically, the general control unit 103 suspends activation of the ringer by suspending outputting a ring tone signal to the audio output unit 109.

If the general control unit 103 receives a one-ring-call threshold value or a ringer setting flag value from the operation unit 111, the general control unit 103 writes the received value over an existing, corresponding value in the storage unit 108.

The general control unit 103 also stores acquired caller's phone numbers into the storage unit 108 by attaching one-ring-call flag values, as specified by the one-ring-call judgment unit 107, to the caller's phone numbers on a one-to-one basis.

In the above case, if the general control unit 103 receives from the one-ring-call judgment unit 107 an instruction to attach a one-ring-call flag value "1" to an acquired caller's phone number, the general control unit 103 stores the acquired caller's phone number with the one-ring-call flag value "1" attached thereto into the storage unit 108, and inhibits the display unit 104 from displaying the acquired caller's phone number as a phone number registered with the call register.

Up to now, the process for outgoing and incoming calls executed by the general control unit 103 has been described.

The general control unit 103 also receives from the operation unit 111 names and telephone numbers that are to be registered with what is called telephone directory, and stores the received names and telephone numbers into the storage unit 108. When doing this, the general control unit 103 attaches a one-ring-call flag value "0" to each of the telephone numbers.

The transmission/reception unit 102 is a radio circuit for transmitting and receiving a radio signal, and includes a filter and an amplifier. In accordance with an instruction by the general control unit 103, the transmission/reception unit 102 transmits communication data such as audio data, image data, or character data by radio, and receives communication data from outside sources and outputs the received data to the general control unit 103.

The antenna unit 101 is a whip antenna for receiving.

The audio output unit 109 is a speaker having a piezoelectric element, and outputs audio in accordance with a signal received from the general control unit 103.

More specifically, if it receives a ring tone signal from the general control unit 103, the audio output unit 109 outputs tinkle of a bell or a ringing melody, and if it receives a voice signal, the audio output unit 109 outputs voice of a caller, a receiver or the like.

The display unit 104 and display unit 204 are organic EL (Electro Luminescence) displays or the like, and have functions to display characters and images in accordance with signals received from the general control unit 103.

The storage unit 108 includes a recording medium such as a non-volatile memory, and stores data output from the general control unit 103.

The storage unit 108 also stores value "0" as the default value of the ringer setting flag, and value "3" as the default value of the one-ring-call threshold value.

The matching unit 106, upon receiving from the general control unit 103 a caller's phone number, refers to the storage unit 108 and judges whether the caller's phone number matches any telephone number stored in the storage unit 108, and if there is no match, outputs a match-none signal to the one-ring-call judgment unit 107; and if there is a match, the matching unit 106 outputs a match signal and a one-ring-call flag value attached to the telephone number to the one-ring-call judgment unit 107.

The one-ring-call judgment unit 107 receives: a time from the counting unit 105; the match-none signal or a pair of the match signal and a one-ring-call flag value from the matching unit 106; and the call disruption notification from the general control unit 103.

When receiving a pair of the match signal and a one-ring-call flag value "1", the one-ring-call judgment unit 107 outputs the connection rejection instruction to the general control unit 103, and instructs the counting unit 105 to end counting.

When receiving a pair of the match signal and a one-ring-call flag value "0", the one-ring-call judgment unit 107 outputs the connection permission instruction to the general control unit 103, and instructs the counting unit 105 to end counting.

When receiving the match-none signal, the one-ring-call judgment unit 107 outputs the connection permission instruction to the general control unit 103, refers to the one-ring-call threshold value stored in the storage unit 108 and judges whether it receives the call disruption notification from the general control unit 103 before any count value received from the counting unit 105 reaches or exceeds the one-ring-call threshold value. If it judges affirmatively, the one-ring-call judgment unit 107 instructs the general control unit 103 to store the acquired caller's phone number into the storage unit 108 together with one-ring-flag value "1" attached thereto, and instructs the counting unit 105 to end counting.

If it judges negatively for the above judgment, the one-ring-call judgment unit 107 instructs the general control unit 103 to store the acquired caller's phone number into the storage unit 108 together with one-ring-flag value "0" attached thereto, and instructs the counting unit 105 to end counting.

Data

Now, data that the mobile station 100 having the above-described construction uses will be explained.

Figure 3:
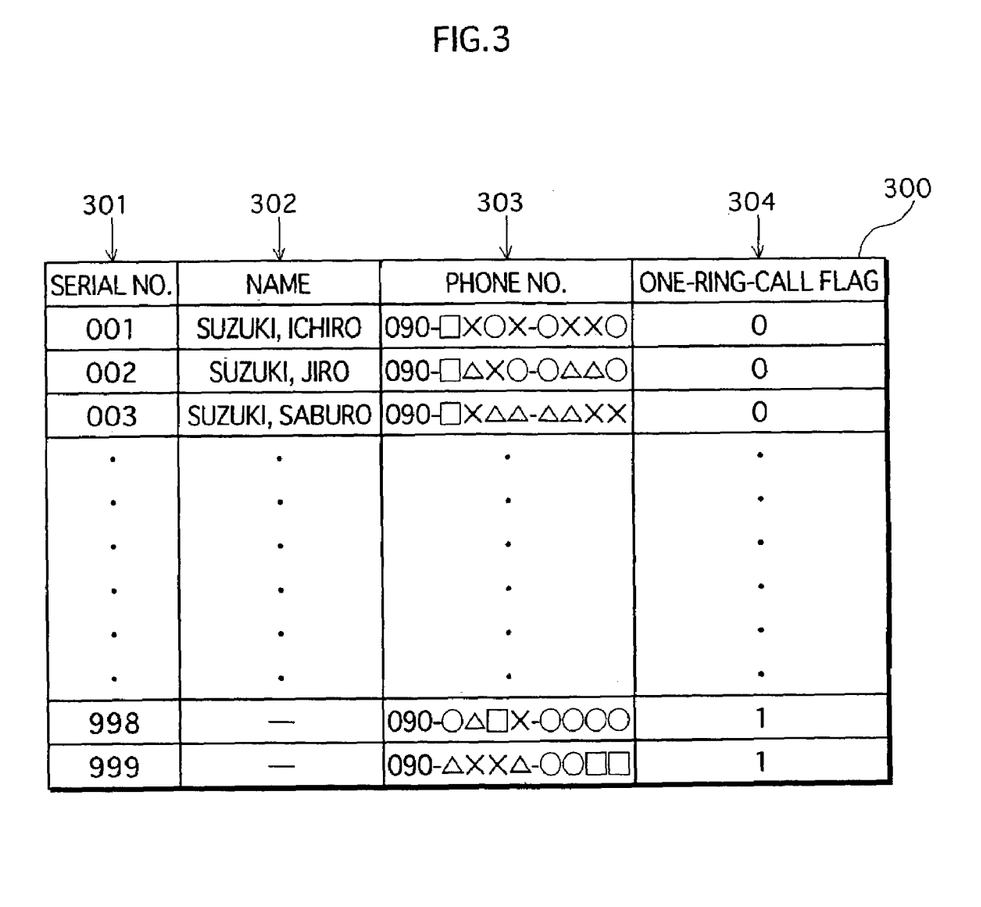
FIG. 3 shows a logical structure of a table stored in the storage unit.

FIG. 3 shows a logical structure of a table 300 stored in the storage unit 108.

As shown in FIG. 3, a number column 301 has sequential numbers 001 through 999; a name column 302 has names; a telephone number column 303 has telephone numbers each of which corresponds to a name on the same row in the name column 302; and a one-ring-flag column 304 has values of the one-ring-flag.

Operation

Figure 4:
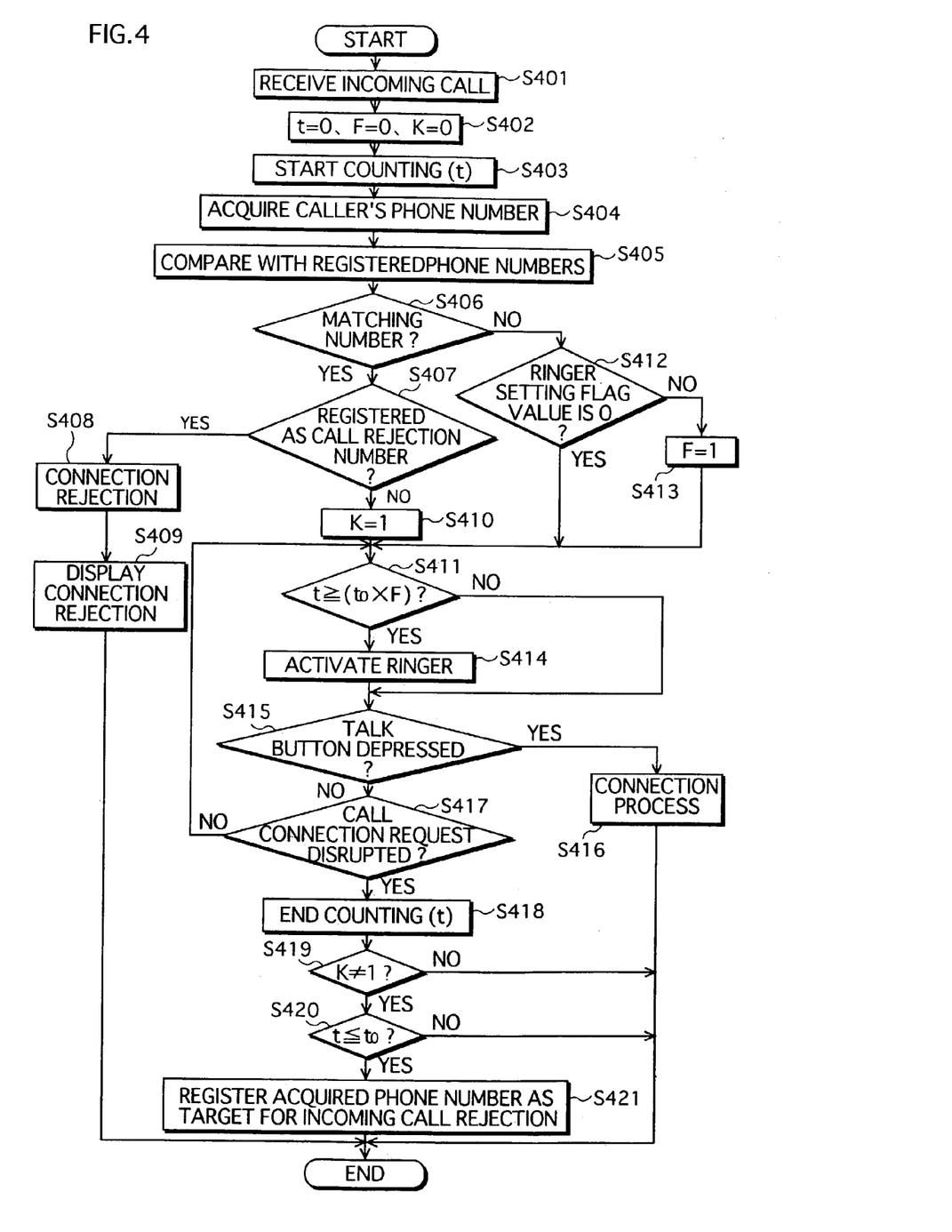
FIG. 4 is a flowchart of a process in which a one-ring call is detected upon reception of an incoming call and a telephone number acquired from a one-ring call is stored with indication of one-ring call.

FIG. 4 is a flowchart of a process in which a one-ring call is detected upon reception of an incoming call and a telephone number acquired from a one-ring call is stored with indication of one-ring call.

When an incoming call is received, the transmission/reception unit 102 receives preparatory data that is necessary for the call connection and includes the caller's phone number (step S401), and outputs the preparatory data to the general control unit 103.

Upon receiving the preparatory data, the general control unit 103 notifies the counting unit 105, one-ring-call judgment unit 107, and matching unit 106 of the incoming call.

Upon receiving the notification of the incoming call, the one-ring-call judgment unit 107 sets the values of the variable F and variable K to "0", respectively, and the counting unit 105 sets value "t" to "0" (step S402), and the counting unit 105 starts counting (step S403).

The matching unit 106 receives the caller's phone number from the general control unit 103 as well as the notification of the incoming call (step S404), compares it with the telephone numbers stored in the storage unit 108 (step S405) and judges whether it matches any telephone number stored in the storage unit 108 (step S406). If there is a match, the matching unit 106 outputs a match signal and a one-ring-call flag value attached to the telephone number to the one-ring-call judgment unit 107. The one-ring-call judgment unit 107 then judges whether the one-ring-call flag value is "1", that is to say, whether the caller's phone number has been registered as a call rejection number (step S407). If the one-ring-call flag value is "1", the one-ring-call judgment unit 107 outputs the connection rejection instruction to the general control unit 103 (step S408).

In accordance with the instruction, the general control unit 103 notifies the base station of rejection of connection to the call, and the base station disrupts the connection process.

The general control unit 103 then causes the display unit 104 to display a message to convey that the incoming call was rejected (step S409), and ends the process.

If the one-ring-call judgment unit 107 judges in the step S407 that the one-ring-call flag value is not "1", the one-ring-call judgment unit 107 sets the variable K to "1" (step S410).

The one-ring-call judgment unit 107 then judges whether a condition "$t \geq (t_0 \times F)$" is met, where "t" represents a count value output from the counting unit 105 and "$t_0$" represents the one-ring-call threshold value (step S411).

If the matching unit 106 judges in the step S406 that there is no match between the caller's phone number and the telephone numbers stored in the storage unit 108, the matching unit 106 notifies the one-ring-call judgment unit 107 of the fact. Then the one-ring-call judgment unit 107 judges whether the ringer setting flag value is "0" (step S412). If the ringer setting flag value is "0", the control goes to the step S411.

If it is judged in the step S412 that the ringer setting flag value is not "0", the one-ring-call judgment unit 107 sets the variable F to "1" (step S413), then the control goes to the step S411.

If it is judged affirmatively in the step S411, the one-ring-call judgment unit 107 sends the ringer activation instruction to the general control unit 103 (step S414), then judges whether a talk button has been depressed (step S415).

If it is judged negatively in the step S411, the control If it is judged in the step S415 that the talk button has been depressed, the one-ring-call judgment unit 107 sends the connection permission instruction to the general control unit 103.

Upon receiving the connection permission instruction, the general control unit 103 executes the process for connecting to the incoming call (step S416).

If it is judged negatively in the step S415, the one-ring-call judgment unit 107 judges whether the call connection request from the base station has been disrupted (step S417) If it is judged negatively in the step S417, the control returns to the step S411.

If it is judged affirmatively in the step S417, the one-ring-call judgment unit 107 instructs the counting unit 105 to end counting (step S418).

Upon receiving the above instruction, the counting unit 105 ends counting.

The one-ring-call judgment unit 107 judges whether the variable K value is other than "1" (step S419). If it is judged affirmatively in the step S419, the process ends.

If it is judged negatively in the step S419, the one-ring-call judgment unit 107 judges whether a condition "$t \leq t_0$" is met (step S420). If it is judged affirmatively in the step S420, the one-ring-call judgment unit 107 instructs the general control unit 103 to attach the one-ring-call flag set to "1" to the acquired caller's phone number and store the acquired caller's phone number with the one-ring-call flag into the storage unit 108 (step S421), and ends the process.

If it is judged negatively in the step S420, the one-ring-call judgment unit 107 ends the process.

Displayed Screens

Figure 5:
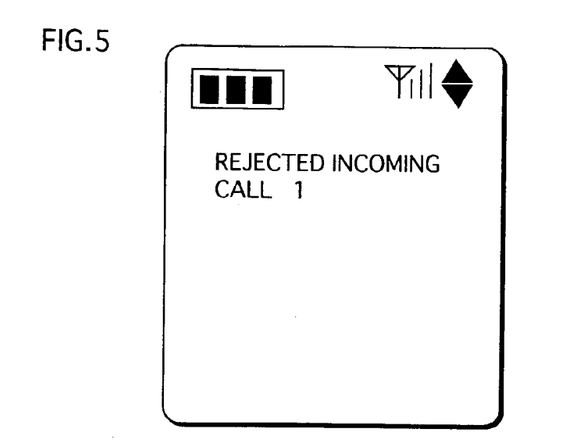
FIG. 5 shows an example of the message displayed on the display unit in the step S409 shown in FIG. 4 to convey that a connection to an incoming call was rejected.

FIG. 5 shows an example of the message displayed on the display unit 104 in the step S409 shown in FIG. 4 to convey that a connection to an incoming call was rejected.

When a connection to an incoming call is rejected, the general control unit 103 requests the base station to disrupt the call connection, immediately after the general control unit 103 acquires the caller's phone number. As a result of this, the calling operation is not performed.

In doing the above, the general control unit 103 also inhibits the display unit 104 from displaying the caller's phone number.

With such an arrangement, the user is not affected by such an incoming call, and does not recognize the rejection of the incoming call until the user sees the message on the display unit 104. Accordingly, it does not happen that the user gets back to the caller of the incoming call.

Meanwhile, as shown in FIG. 3, the table 300 stores telephone numbers to each of which the one-ring-call flag, which is set to "1" or "0", is attached.

In an ordinary display operation, that is, in displaying what is called a telephone directory, the general control unit 103 only allows the display unit 104 to display telephone numbers that have a value "0" attached thereto as the one-ring-call flag.

However, in response to a certain operation, the general control unit 103 allows the display unit 104 to also display telephone numbers that have a value "1" as the one-ring-call flag. The reason why this function is provided is as follows. There is a possibility, for example, that a friend of the user makes a call to the user and disrupts the call before the user answers the call, for the purpose of causing his/her phone number to be registered with the user's telephone, that is, in the same manner as the one-ring-callers do. Notified of such a call from the friend, the user may want to register his/her friend's phone number with his/her telephone and originate a call to the friend.

Figure 6:
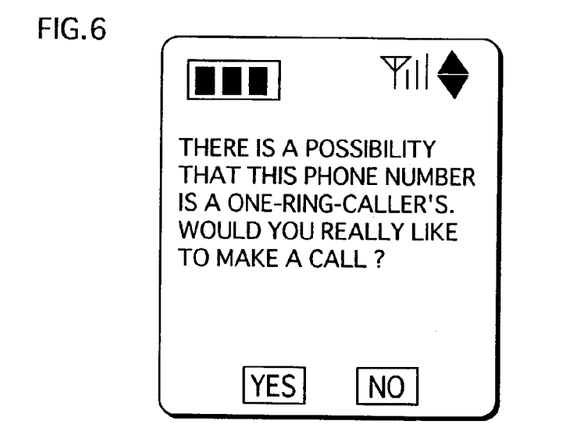
FIG. 6 shows an example of the message displayed on the display unit if the user tries to make a call to a telephone number that may be a one-ring-caller's, so that the user can confirm if the user would really like to make a call.

FIG. 6 shows an example of the message displayed on the display unit 104 if the user tries to make a call to a telephone number to which a one-ring-call flag value "1" is attached, that is to say, to a telephone number that may be a one-ring-caller's. This message lets the user confirm if the user would really like to make a call.

As described above, in the present embodiment, the mobile station 100 judges for each incoming call from an unregistered party whether the incoming call is a one-ring-call or not. The telephone number judged as a one-ring-caller's is registered as a target for connection rejection. After this, when an incoming call is received from the one corresponding to the registered phone number (alleged one-ring-caller), the telephone number is not displayed as a phone number registered with the call register, and the ringer does not ring.

This prevents the user from calling back to the alleged one-ring-caller or being annoyed by the ring tone.

Also, it is possible to set the ringer setting flag to "1" when a one-ring-call is received first so that the ringer is not activated for a set period. This arrangement also prevents the user from calling back to the alleged one-ring-caller or being annoyed by the ring tone.

In the present embodiment, a mobile station such as a mobile phone is used as an example. However, not limited to this, the present invention is also applicable to a telephone connected to a regular telephone line.

The present embodiment does not describe how a telephone number registered as a one-ring-caller's is treated thereafter, but a one-ring-caller's phone number may be re-registered as an ordinary telephone number according to an instruction by the user.

When such an instruction is input by the user, the general control unit 103, according to the instruction, changes the value of the one-ring-call flag attached to the telephone number from "1" to "0".

Also in the present embodiment, when the general control unit 103 stores a caller's phone number, which has been acquired from an incoming call, with the one-ring-call flag value "1" attached thereto into the storage unit 108, the general control unit 103 also inhibits the display unit 104 from displaying the acquired caller's phone number as the one registered with the call register. However, the general control unit 103 may display the acquired caller's phone number on the display unit 104, together with a message conveying that an incoming call presumed to be a one-ring-call was received.

Figure 7:
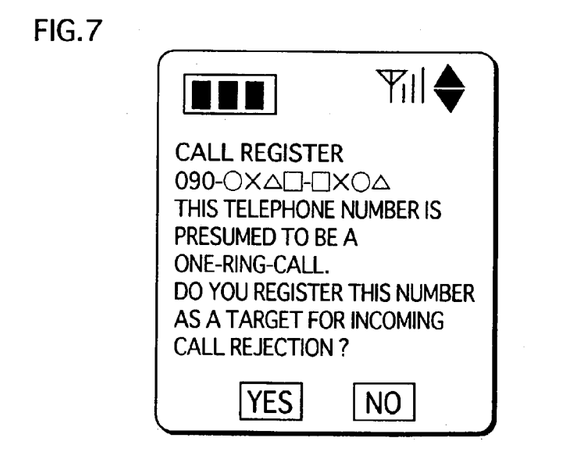
FIG. 7 shows an example of a display screen for the case where an incoming call phone number is displayed on the display unit together with a message conveying that the incoming call is presumed to be a one-ring-call.

FIG. 7 shows an example of a display screen for the above case where an incoming call phone number is displayed on the display unit 104 together with a message conveying that the incoming call is presumed to be a one-ring-call.

The mobile station 100 may be provided with a light unit that turns on or off depending on whether a ring tone is output from the audio output unit 109, or maybe provided with a vibration alert unit that vibrates depending on whether a ring tone is output from the audio output unit 109.

These units are used for the purpose of notifying the user of an incoming call. If the ringer is inhibited from activating and ringing, these units are also inhibited from activating and turning on/off or vibrating, not allowing the user to recognize the incoming call.

In the present embodiment, after receiving an incoming call that is judged to be rejected, the mobile station 100 notifies the base station of a connection rejection. However, when the general control unit 103 stores a caller's phone number, which has been acquired from an incoming call, with the one-ring-call flag value "1" attached thereto into the storage unit 108, the mobile station 100 may request the base station not to connect any call from then on from the caller, to the mobile station 100. When this arrangement is made, no incoming call is to be received anymore from the caller having the telephone number registered as a one-ring-caller's.

In the present embodiment, each time an incoming call is received, the mobile station 100 judges whether the incoming call is a one-ring-call. However, each time an incoming call is received, the mobile station 100 may record a telephone number acquired from the incoming call together with a call time period during which the incoming call continued so that later, the user can judge whether the incoming call is a one-ring-call or not by referring to display of the acquired telephone number and the call time period.

In the present embodiment, a time period during which an incoming call is received without being disconnected is used as a parameter in judging whether the incoming call is a one-ring-call. However, when the mobile station outputs an intermittent sound such as a bell, the number of times the sound is output may be used as a parameter in judging the same.

In the present embodiment, the user sets the ringer setting flag to "1" when the user wants to inhibit the ringer from ringing before completion of the judgment on whether an incoming call is a one-ring-call or not, and sets the flag to "0" to allow the ringer to ring. However, the settings of the ringer setting flag are not limited to this. For example, the general control unit 103 may cause the display unit 104 to display a message "Would you like to set the ringer to ring even for a very short incoming call?" together with options "yes" and "no", and if the user selects "yes" via the operation unit 111, the general control unit 103 sets the ringer setting flag to "0", and if the user selects "no", the general control unit 103 sets the ringer setting flag to "1".

In the present embodiment, the display unit 104 is an organic EL display or the like. However, the display unit 104 may be another display device such as an LCD (Liquid Crystal Display).

In the present embodiment, when the general control unit 103 stores a caller's phone number, which has been acquired from an incoming call, with the one-ring-call flag value "1" attached thereto into the storage unit 108, the general control unit 103 also inhibits the display unit 104 from displaying the acquired caller's phone number as the one registered with the call register. However, in such a case, the general control unit 103 may display the acquired caller's phone number as the one registered with the call register on the display unit 104 in a manner in which the user can recognize which of the one-ring-call flag value "1" and "0" is attached to the telephone number.

More particularly, different colors may be used for the telephone numbers with the one-ring-call flag value "1" and "0", respectively. Alternatively, incoming call marks with different shapes may be attached to the telephone numbers displayed on the display unit 104 with the one-ring-call flag value "1" and "0", respectively.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A telephone comprising:
a recording medium;
an acquisition unit operable to, when an incoming call is received, acquire a caller's phone number corresponding to the incoming call;
a judgment unit operable to judge whether a time period between a start of a reception of the incoming call and a disconnection of the incoming call is shorter than a predetermined time period; and
a first storage execution unit operable to, if the judgment unit judges affirmatively for the incoming call, store the acquired phone number into the recording medium as a target for a connection rejection so that if an incoming call is received from a caller having the stored phone number thereafter, a connection thereto is rejected,
wherein the predetermined time period is a one-ring-call threshold value set in a scale of seconds.

2. The telephone of claim 1 further comprising
a connection rejection unit operable to, if the phone number acquired by the acquisition unit matches a phone number having already been stored in the recording medium, execute a connection rejection process for rejecting a connection to the incoming call corresponding to the matching phone number.

3. The telephone of claim 2 further comprising:
a second storage execution unit operable to, if the judgment unit judges negatively for the incoming call, store the acquired phone number into the recording medium as an ordinary phone number;
a determination unit operable to determine, for each phone number stored in the recording medium, whether the phone number is an ordinary phone number or a target for a connection rejection; and
a first display unit operable to display only phone numbers determined as ordinary phone numbers by the determination unit.

4. The telephone of claim 3, wherein
the first storage execution unit attaches a flag to the phone number acquired by the acquisition unit if the judgment unit judges affirmatively for the incoming call so that the acquired phone number is stored together with the flag into the recording medium.

5. The telephone of claim 4, wherein the first storage execution unit stores the phone number to which the flag has been attached, into the recording medium only if the phone number has not been stored in the recording medium.

6. The telephone of claim 5 further comprising:
a deletion receiving unit operable to receive from an operator a specification of a phone number that is a target for deleting the flag attached thereto; and
a deletion unit operable to turn the specified phone number into an ordinary phone number by deleting the flag from the specified phone number that is stored in the recording medium.

7. The telephone of claim 1 further comprising a storage notification unit operable to, after the first storage execution unit stores the phone number into the recording medium, notify an operator of the storing by the first storage execution unit.

8. The telephone of claim 7, wherein the storage notification unit displays the phone number stored in the recording medium when notifying the operator of the storing.

9. The telephone of claim 8 further comprising:
an instruction receiving unit operable to receive an instruction from the operator;
a second display unit operable to display the phone number acquired by the acquisition unit if the judgment unit judges affirmatively for the incoming call; and
a storage capability inquiring unit operable to inquire the operator whether the displayed phone number should be stored into the recording medium, wherein
the first storage execution unit stores the phone number into the recording medium only if the instruction receiving unit receives from the operator an instruction to store the phone number.

10. The telephone of claim 9 further comprising:
a call-originating confirmation unit operable to, if the instruction receiving unit receives from the operator an instruction to originate a call by dialing the phone number stored in the recording medium, inquire the operator whether to originate the call by dialing the phone number stored in the recording medium; and
a call-originating unit operable to originate the call only if the instruction receiving unit receives an instruction to originate the call in response to the inquiry made by the call-originating confirmation unit.

11. The telephone of claim 1 further comprising:
a call notification unit operable to keep notifying an operator of the reception of the incoming call all the while the incoming call is received, by outputting a sound, a vibration, or light; and
a call notification inhibition unit operable to inhibit the call notification unit from notifying the operator of the reception during the predetermined time period.

12. A telephone comprising:
a recording medium;
an acquisition unit operable to, when an incoming call is received, acquire a caller's phone number corresponding to the incoming call;
a judgment unit operable to judge whether a time period between a start of a reception of the incoming call and a disconnection of the incoming call is shorter than a predetermined time period;
a call disconnection information generating unit operable to, if the judgment unit judges affirmatively for the incoming call, generate call disconnection information indicating that the incoming call was disconnected within the predetermined time period, and store the acquired phone number and the call disconnection information as a pair into the recording medium; and
a call register display unit operable to display the pair of the phone number and the call disconnection information as information registered with a call register,
wherein the predetermined time period is a one-ring-call threshold value set in a scale of seconds.

13. A phone number registration method which is used in a telephone having a recording medium, and is used for registering a phone number as a target for a connection rejection so that if an incoming call is received from a caller having the registered phone number, a connection thereto is rejected, the phone number registration method comprising:
an acquisition step for, when an incoming call is received, acquiring a caller's phone number corresponding to the incoming call;
a judgment step for judging whether a time period between a start of a reception of the incoming call and a disconnection of the incoming call is shorter than a predetermined time period; and
a storage execution step for, if the judgment step judges affirmatively for the incoming call, storing the acquired phone number into the recording medium as a target for a connection rejection so that if an incoming call is received from a caller having the stored phone number thereafter, a connection thereto is rejected,
wherein the predetermined time period is a one-ring-call threshold value set in a scale of seconds.

14. A call register display method which is used in a telephone having a recording medium, and is used for displaying a phone number of an incoming call, the call register display method comprising:
an acquisition step for, when an incoming call is received, acquiring a caller's phone number corresponding to the incoming call;
a judgment step for judging whether a time period between a start of a reception of the incoming call and a disconnection of the incoming call is shorter than a predetermined time period;
a call disconnection information generating step for, if the judgment step judges affirmatively for the incoming call, generating call disconnection information indicating that the incoming call was disconnected within the predetermined time period, and storing the acquired phone number and the call disconnection information as a pair into the recording medium; and
a call register display step for displaying the pair of the phone number and the call disconnection information as information registered with a call register,
wherein the predetermined time period is a one-ring-call threshold value set in a scale of seconds.

15. A telephone comprising:
a recording medium;
an acquisition unit operable to, when an incoming call is received, acquire a caller's phone number corresponding to the incoming call;
a time measuring unit operable to measure a time period between a start of a reception of the incoming call and a disconnection of the incoming call;
a judgment unit operable to judge whether a time period between a start of a reception of the incoming call and a disconnection of the incoming call is shorter than a predetermined time period that is a one-ring-call threshold value set in a scale of seconds; and a storage execution unit operable to, if the judgment unit judges affirmatively for the incoming call, store the acquired phone number into the recording medium as a target for a connection rejection so that if a subsequent incoming call is received from a caller having the same stored phone number, a connection thereto is rejected.

* * * * *